(12) United States Patent
Iida et al.

(10) Patent No.: US 10,552,881 B2
(45) Date of Patent: Feb. 4, 2020

(54) INFORMATION PROCESSING DEVICE, INFORMATION PROCESSING METHOD, AND PROGRAM

(71) Applicant: SONY CORPORATION, Tokyo (JP)

(72) Inventors: Minori Iida, Tokyo (JP); Eiji Yamada, Tokyo (JP); Kenichiro Ueki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 330 days.

(21) Appl. No.: 15/524,046

(22) PCT Filed: Oct. 2, 2015

(86) PCT No.: PCT/JP2015/078038
§ 371 (c)(1),
(2) Date: May 3, 2017

(87) PCT Pub. No.: WO2016/113958
PCT Pub. Date: Jul. 21, 2016

(65) Prior Publication Data
US 2017/0337595 A1  Nov. 23, 2017

(30) Foreign Application Priority Data
Jan. 13, 2015 (JP) ................. 2015-004495

(51) Int. Cl.
*G06Q 30/00* (2012.01)
*G06Q 30/02* (2012.01)
*G06Q 50/10* (2012.01)

(52) U.S. Cl.
CPC ..... *G06Q 30/0282* (2013.01); *G06Q 30/0214* (2013.01); *G06Q 50/10* (2013.01)

(58) Field of Classification Search
None
See application file for complete search history.

(56) References Cited

U.S. PATENT DOCUMENTS 7,373,318 B2 * 5/2008 Kutsumi ............... G06Q 30/02
705/26.7
2001/0044759 A1 * 11/2001 Kutsumi ............... G06Q 30/02
705/26.7

(Continued)

FOREIGN PATENT DOCUMENTS

JP 2009-268036 A 11/2009
JP 2013-149052 A 8/2013

(Continued)

OTHER PUBLICATIONS

International Search Report dated Dec. 22, 2015 in PCT/JP2015/078038.

*Primary Examiner* — Matthew T Sittner
(74) *Attorney, Agent, or Firm* — Xsensus LLP

(57) ABSTRACT

[Object] To make it possible to urge a plurality of users to recommend content.
[Solution] Provided is an information processing device including: an acquisition unit configured to acquire a plurality of pieces of specification information for specifying content from a plurality of users, respectively; and a control unit configured to calculate the number of times in which each piece of the content is specified by the plurality of users on the basis of the plurality of pieces of the specification information acquired from the plurality of users and control application of an incentive to the plurality of users on the basis of the calculated number of times.

10 Claims, 12 Drawing Sheets

(56) References Cited

U.S. PATENT DOCUMENTS

| | | | |
|---|---|---|---|
| 2002/0120503 A1* | 8/2002 | Iwayama | G06Q 30/02 705/14.56 |
| 2007/0247979 A1* | 10/2007 | Brillon | G06Q 30/0603 369/30.06 |
| 2008/0229360 A1* | 9/2008 | Icho | H04N 21/25891 725/46 |
| 2009/0187480 A1* | 7/2009 | Bernard | G06Q 20/102 705/14.69 |
| 2012/0036475 A1* | 2/2012 | Yoshitomi | G06F 3/0482 715/810 |
| 2012/0059690 A1* | 3/2012 | Ruckart | G06Q 30/0207 705/14.1 |
| 2012/0143665 A1* | 6/2012 | Swain | G06Q 30/02 705/14.16 |
| 2013/0085837 A1* | 4/2013 | Blume | G06Q 30/0241 705/14.41 |
| 2013/0115981 A1* | 5/2013 | Toksvig | G06Q 50/01 455/466 |
| 2013/0173460 A1* | 7/2013 | Lee | H04L 67/104 705/39 |
| 2014/0058814 A1* | 2/2014 | Hayden | G06Q 30/0214 705/14.16 |
| 2014/0278873 A1* | 9/2014 | Shimizu | G06Q 30/0217 705/14.19 |
| 2015/0005020 A1* | 1/2015 | Bastaldo-Tsampalis | H04W 4/029 455/466 |
| 2015/0006461 A1* | 1/2015 | Miyata | G06F 16/9537 706/50 |
| 2015/0046878 A1* | 2/2015 | Sutou | G06F 3/04817 715/835 |
| 2015/0058873 A1* | 2/2015 | Newell | H04N 21/47214 725/14 |
| 2015/0067505 A1* | 3/2015 | Metcalf | G06F 16/958 715/716 |
| 2017/0228787 A1* | 8/2017 | Oyaga | G06Q 30/0264 |
| 2017/0337595 A1* | 11/2017 | Iida | G06F 13/00 |

FOREIGN PATENT DOCUMENTS

| | | |
|---|---|---|
| JP | 2013-161102 A | 8/2013 |
| JP | 2013-210725 A | 10/2013 |
| JP | 2013-254288 A | 12/2013 |
| JP | 2014-123318 A | 7/2014 |
| JP | 2014-174912 A | 9/2014 |
| JP | 2014-534773 A | 12/2014 |

* cited by examiner

INFORMATION PROCESSING DEVICE, INFORMATION PROCESSING METHOD, AND PROGRAM

TECHNICAL FIELD

The present disclosure relates to an information processing device, an information processing method, and a program.

BACKGROUND ART

In recent years, a service for providing content to a user via a network has been used as a service for providing various types of information to a user.

For example, Patent Literature 1 discloses a service for providing, to a user, content based on an evaluation value of each of a plurality of recommenders who recommend the content, the evaluation value being applied by the user, in order to accurately provide content desired by the user.

CITATION LIST

Patent Literature

Patent Literature 1: JP 2013-254288A

DISCLOSURE OF INVENTION

Technical Problem

By the way, in a service for providing content to a user, it may be desired to urge a plurality of users to recommend content.

In view of this, the present disclosure proposes an information processing device, an information processing method, and a program, each of which is new, improved, and capable of urging a plurality of users to recommend content.

Solution to Problem

According to the present disclosure, there is provided an information processing device including: an acquisition unit configured to acquire a plurality of pieces of specification information for specifying content from a plurality of users, respectively; and a control unit configured to calculate the number of times in which each piece of the content is specified by the plurality of users on the basis of the plurality of pieces of the specification information acquired from the plurality of users and control application of an incentive to the plurality of users on the basis of the calculated number of times.

According to the present disclosure, there is provided an information processing method, including: acquiring a plurality of pieces of specification information for specifying content from a plurality of users, respectively, by using an information processing device; calculating the number of times in which each piece of the content is specified by the plurality of users on the basis of the plurality of pieces of the specification information acquired from the plurality of users; and controlling application of an incentive to the plurality of users on the basis of the calculated number of times.

According to the present disclosure, there is provided a program for causing a computer configured to control an information processing device to function as an acquisition unit configured to acquire a plurality of pieces of specification information for specifying content from a plurality of users, respectively, and a control unit configured to calculate the number of times in which each piece of the content is specified by the plurality of users on the basis of the plurality of pieces of the specification information acquired from the plurality of users and control application of an incentive to the plurality of users on the basis of the calculated number of times.

Advantageous Effects of Invention

As described above, according to the present disclosure, it is possible to urge a plurality of users to recommend content.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
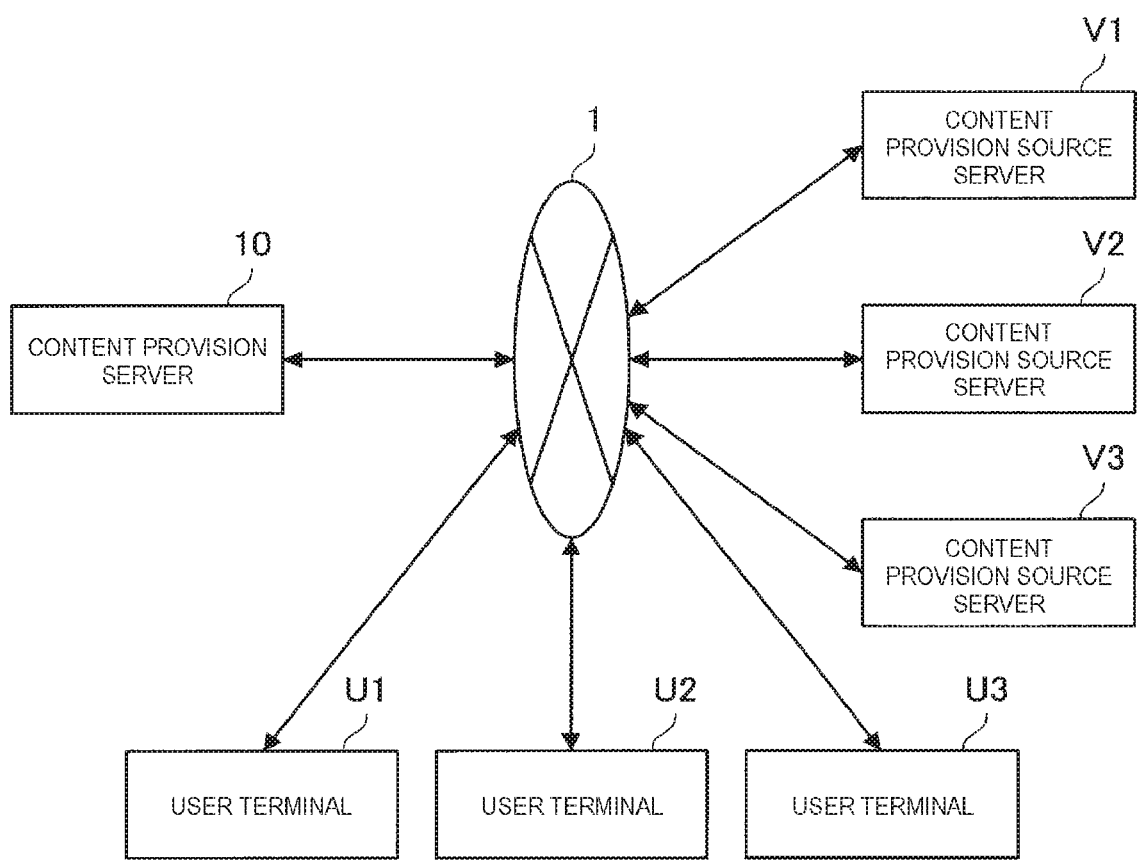
FIG. 1 is an explanatory view showing a specific example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Outline of information processing system according to embodiment of present disclosure
2. Content provision server according to embodiment of present disclosure
   2-1. Functional configuration
   2-2. Operation
   2-3. Effects
   2-4. Application example
3. Hardware configuration
4. Conclusion

1. Outline of Information Processing System According to Embodiment of Present Disclosure First, an outline of an information processing system according to an embodiment of the present disclosure will be described with reference to FIG. 1.

FIG. 1 is an explanatory view showing a specific example of the information processing system according to the embodiment of the present disclosure. As shown in FIG. 1, the information processing system according to the embodiment of the present disclosure includes content provision source servers V1 to V3, user terminals U1 to U3, and a content provision server 10. The content provision source servers V1 to V3, the user terminals U1 to U3, and the content provision server 10 communicate to one another via a wired or wireless information network 1. Note that the number of content provision source servers and the number of user terminals shown in FIG. 1 are merely examples, and a technical scope of the present disclosure is not limited to such numbers. Hereinafter, in a case where it is unnecessary to distinguish the content provision source servers V1 to V3 or the user terminals U1 to U3 in particular, the content provision source servers V1 to V3 and the user terminals U1 to U3 will be generally referred to simply as "content provision source servers V" and "user terminals U", respectively.

The content provision source servers V1 to V3 transmit various types of content to an external device via the wired or wireless information network 1. Herein, the content means, for example, information on news, information on sports, information on commodities posted on an electronic commerce (EC) site, information on television programs, information on games, information on people belonging to an organization, or information on commodities sold by a maker. Further, the content provision source servers V1 to V3 update various types of content to be transmitted to the external device as necessary.

The user terminals U1 to U3 have a function of displaying an image and a function of accepting input from users. The above functions of the user terminals U1 to U3 are realized by, for example, a device such as a personal computer, a smartphone, or a tablet terminal. The user terminals U1 to U3 transmit a request to display various types of screens to the content provision server 10 in response to user input. Then, the user terminals U1 to U3 receive information such as content from the content provision server 10 and display the received information. The users can specify a piece of content to be recommended to another user among pieces of content displayed on the user terminals U1 to U3. Then, the user terminals U1 to U3 transmit specification information for specifying content to the content provision server 10 in response to user input. The user terminals U1 to U3 can also receive content transmitted from the content provision source servers V1 to V3 and display the received content.

The content provision server 10 is an example of the information processing device according to the present disclosure. The content provision server 10 transmits information such as content to the user terminals U1 to U3 in response to a request to display various types of screens from the user terminals U1 to U3. For example, the content provision server 10 receives content transmitted from the content provision source servers V1 to V3 and transmits the above content to the user terminals U1 to U3 in response to a request to display various types of screens from the user terminals U1 to U3. The content provision server 10 updates content to be transmitted to the user terminals U1 to U3 for each predetermined time period. For example, the content provision server 10 updates content to be transmitted to the user terminals U1 to U3 every day.

Furthermore, the content provision server 10 generates various types of rankings on the basis of specification information for specifying content by a plurality of users, the specification information being transmitted from the user terminals U1 to U3, and transmits information indicating the generated various types of rankings to the user terminals U1 to U3 in response to a request to display various types of screens from the user terminals U1 to U3.

For example, the content provision server 10 generates a content ranking on the basis of the number of times in which each piece of content is specified by the plurality of users. Then, the content provision server 10 transmits information indicating the generated content ranking to the user terminals U1 to U3 in response to a request to display various types of screens from the user terminals U1 to U3. By looking at the content ranking, the user can know a degree to which each piece of content is recommended by the plurality of users.

Further, the content provision server 10 applies a point to the plurality of users on the basis of the number of times in which each piece of content is specified by the plurality of users. Thus, it is possible to improve the users' motivation for recommending content. Therefore, it is possible to urge the plurality of users to recommend content.

Further, the content provision server 10 generates a user ranking on the basis of a point applied to each user. Then, the content provision server 10 transmits information indicating the generated user ranking to the user terminals U1 to U3 in response to a request to display various types of screens from the user terminals U1 to U3. By looking at the user ranking, the user can know a rank of an accumulated point of each user. Further, the content provision server 10 stores the accumulated point of each user and repeatedly update the user ranking in a certain time period.

2. Content Provision Server According to Embodiment of Present Disclosure

2-1. Functional Configuration

In the preceding section, the outline of the information processing system according to the embodiment of the present disclosure has been described. Next, a configuration of a logical function of the content provision server 10 according to the embodiment of the present disclosure will be described with reference to FIGS. 2 to 9.

Figure 2:
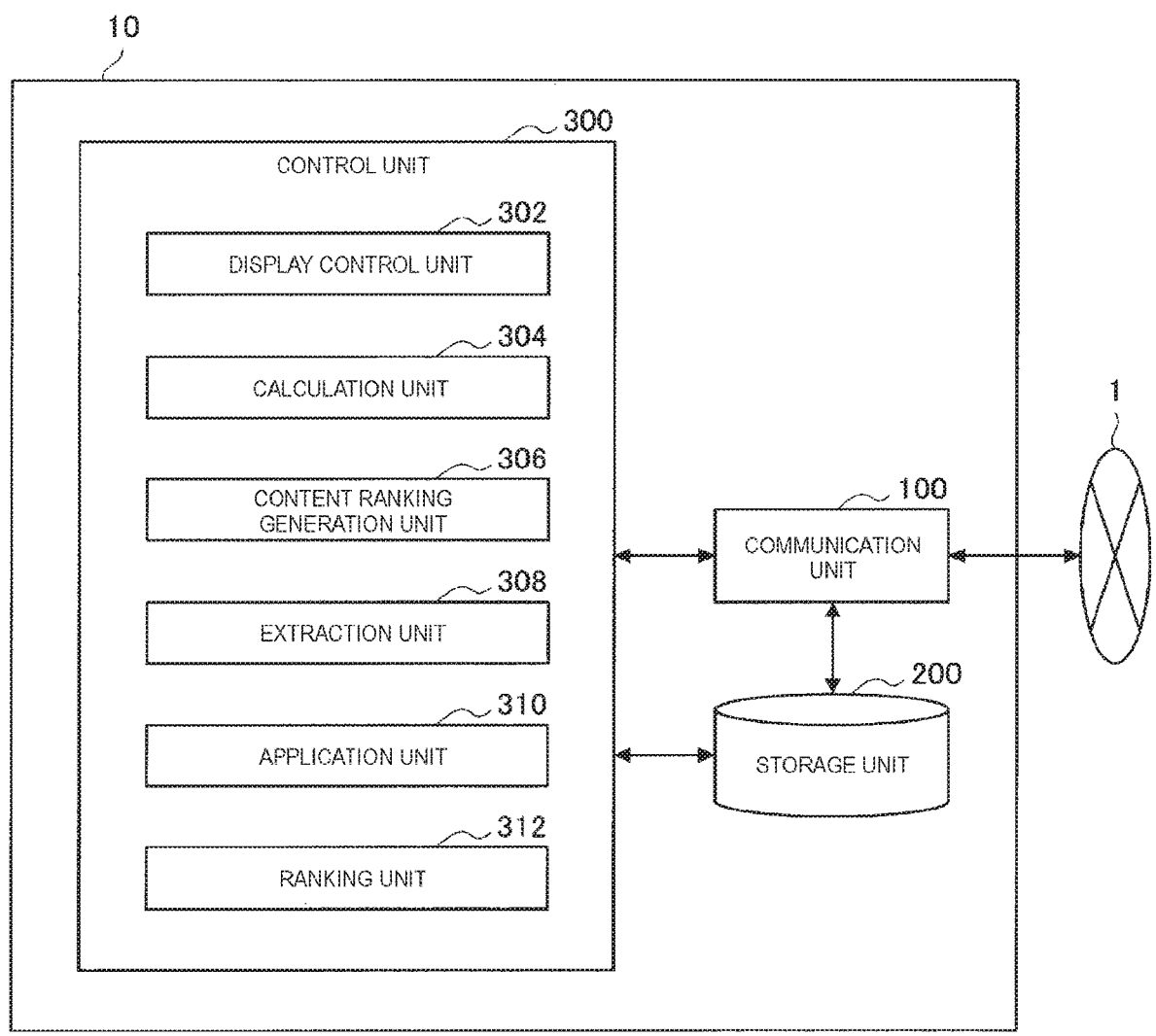
FIG. 2 is an explanatory view showing a specific example of a configuration of a logical function of a content provision server according to an embodiment of the present disclosure.

FIG. 2 is an explanatory view showing a specific example of the configuration of the logical function of the content provision server 10 according to the embodiment of the present disclosure. As shown in FIG. 2, the content provision server 10 includes a communication unit 100, a storage unit 200, and a control unit 300.

[Communication Unit]

The communication unit 100 communicates to an external device outside the content provision server 10 via the wired or wireless information network 1. For example, the communication unit 100 receives a request to display various types of screens from the user terminal U and outputs the received request to display various types of screens to the control unit 300. Further, the communication unit 100 acquires a plurality of pieces of specification information for specifying content from the plurality of users via the user terminals U and stores the plurality of pieces of the specification information acquired from the plurality of users on the storage unit 200. Furthermore, the communication unit 100 receives content transmitted from the content provision source servers V and stores the received content on the storage unit 200. Further, the communication unit 100 transmits information such as content input from the control unit 300 to the user terminals U.

Further, the communication unit 100 may receive category information indicating a category to which each piece of content belongs from the content provision source servers V and store the received category information of each piece of content on the storage unit 200. Herein, the category may be, for example, society, politics, world, economics, IT, sport, or entertainment.

[Storage Unit]

The storage unit 200 stores data to be referred to for various types of processing in the control unit 300. For example, the storage unit 200 stores a plurality of pieces of specification information transmitted from the user terminals U, content transmitted from the content provision source servers V, information indicating a content ranking generated by a content ranking generation unit 306, and information indicating a user ranking generated by a ranking unit 312.

[Control Unit]

The control unit 300 includes a display control unit 302, a calculation unit 304, the content ranking generation unit 306, an extraction unit 308, an application unit 310, and the ranking unit 312.

(Display Control Unit)

In a case where a request to display various types of screens is input to the control unit 300 via the communication unit 100, the display control unit 302 outputs information such as content to the communication unit 100 in response to the input request to display various types of screens. The display control unit 302 transmits the information such as content to the communication unit 100, thereby displaying the information such as content on the user terminal U. For example, the display control unit 302 acquires content transmitted from the content provision source servers V from the storage unit 200 and displays the above content on the user terminal U in response to a request to display various types of screens input to the control unit 300 via the communication unit 100.

Specifically, the display control unit 302 generates a content list on the basis of a plurality of pieces of content transmitted from the content provision source servers V and stores the generated content list on the storage unit 200. Then, the display control unit 302 displays, on the user terminal U, a content list screen showing the content list stored on the storage unit 200. Further, the display control unit 302 generates a content list for each predetermined time period and updates the content list stored on the storage unit 200. For example, the display control unit 302 updates the content list every day.

Note that the display control unit 302 may generate a content list including a plurality of pieces of content transmitted from the same content provision source server V. Further, the display control unit 302 may acquire category information of each piece of content from the storage unit 200 and generate a content list including a plurality of pieces of content belonging to the same category on the basis of the acquired category information of each piece of the content.

Figure 3:
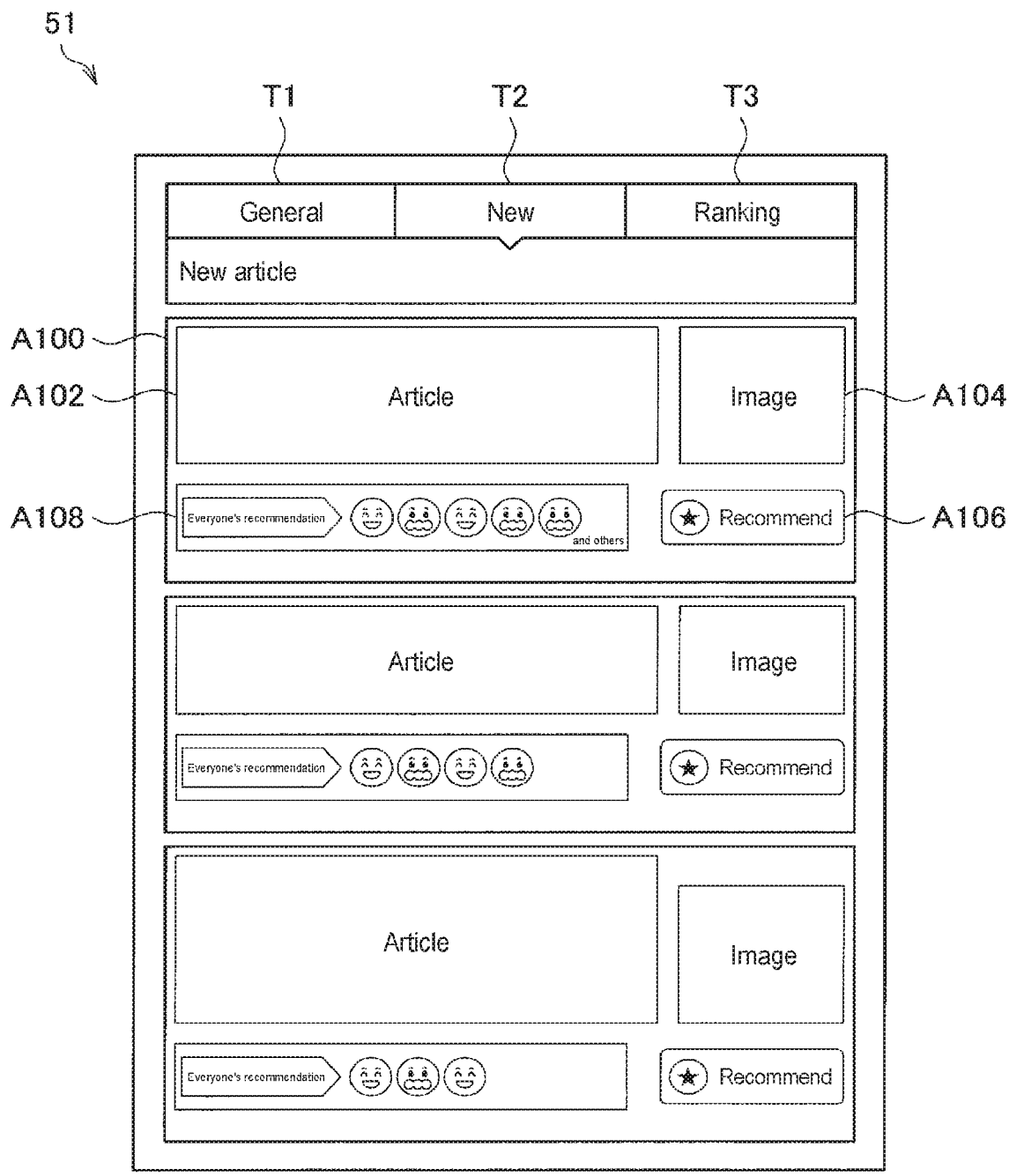
FIG. 3 is an explanatory view showing a specific example of a content list screen displayed on a user terminal.

FIG. 3 is an explanatory view showing a specific example of a content list screen 51 displayed on the user terminal U. In FIG. 3, a content display area A100 is shown as an example of an area showing a single piece of content among a plurality of pieces of content. For example, an article A102 and an image A104 of the content are displayed in the content display area A100. Furthermore, a content specification button A106 for specifying content and specification information A108 of the content by other users are displayed in the content display area A100.

The display control unit 302 causes a user to specify content by causing the user to select the content specification button A106 on the content list screen 51. In this way, the user can specify a piece of content to be recommended to another user among a plurality of pieces of content displayed on the user terminal U. As shown in FIG. 3, the specification information A108 of the content by other users may be, for example, object information on an object representing an impression on the content by other users. Note that the display control unit 302 may restrict the number of objects displayed as the specification information A108 of the content by other users to a certain number.

The display control unit 302 restricts a time period in which the user can specify content to a predetermined time period. For example, the display control unit 302 may restrict the time period in which the user can specify content to one day because the content list is updated every day. Hereinafter, the time period in which the user can specify content is also referred to as "specified time period".

Further, the display control unit 302 determines the number of pieces of content that can be specified by each user within a predetermined time period. For example, in a case where the specified time period is one day, the display control unit 302 may restrict the number of pieces of content that can be specified by each user in one day to a certain number.

Furthermore, the display control unit 302 may determine the number of pieces of content that can be specified by each user within the predetermined time period on the basis of a frequency of access to the content provision server 10 from each user. For example, the display control unit 302 may increase the number of pieces of content that can be specified by the user within the predetermined time period as the frequency of access to the content provision server 10 from the user is higher.

Note that the image A104 of the content and the specification information A108 of the content by other users may not be displayed in the content display area A100. Further, the technical scope of the present disclosure is not limited to an example where the content specification button A106 includes a word "Recommend", and the content specification button A106 may include another word, figure, or symbol, or a combination thereof.

As shown in FIG. 3, the content list screen 51 may include a general tab T1, a new tab T2, and a ranking tab T3 for switching screens. The display control unit 302 causes the user to select various types of tabs, thereby displaying a screen based on the various types of tabs on the user terminal U. The content list screen 51 shown in FIG. 3 is a screen displayed in a case where the new tab T2 is selected. Note that various types of ranking screens displayed in a case where the ranking tab T3 is selected will be described below. Further, in a case where the general tab T1 is selected, the display control unit 302 displays the content list screen 51 and various types of ranking screens side by side on the user terminal U.

Further, the display control unit 302 may display, on the user terminal U, a content detail screen showing detailed information of the content corresponding to the content display area A100 in response to predetermined user input such as a tap or a click to the article A102 of the content.

Figure 4:
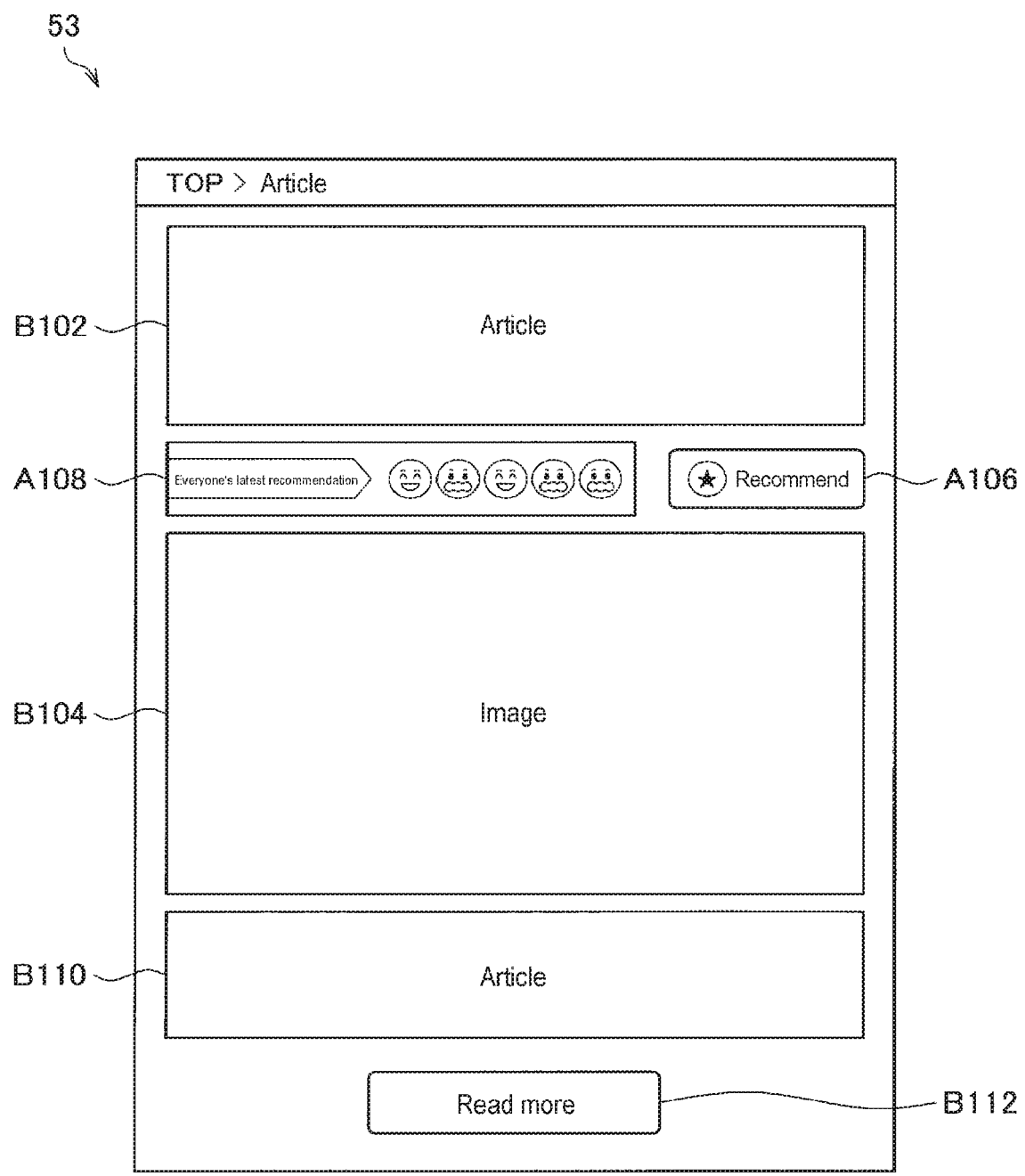
FIG. 4 is an explanatory view showing a specific example of a content detail screen displayed on a user terminal.

FIG. 4 is an explanatory view showing a specific example of a content detail screen 53 displayed on the user terminal U. On the content detail screen 53 shown in FIG. 4, there are displayed an article B102, an article B110, and an image B104 of the content corresponding to the content display area A100, which are more detailed than the article A102 and the image A104 of the content shown in FIG. 3. Further, a link button B112 to an external site is displayed on the content detail screen 53 shown in FIG. 4. The display control unit 302 causes the user to select the link button B112 to cause the user terminal U to communicate to the content provision source server V that is a provision source of the content. In this way, it is possible to provide more detailed information of the content to the user.

In a case where the content specification button A106 is selected by the user on the content list screen 51 shown in FIG. 3 or the content detail screen 53 shown in FIG. 4, the display control unit 302 may display, on the user terminal U, an object selection window 55 for causing the user to select an object representing an impression on the content.

Figure 5:
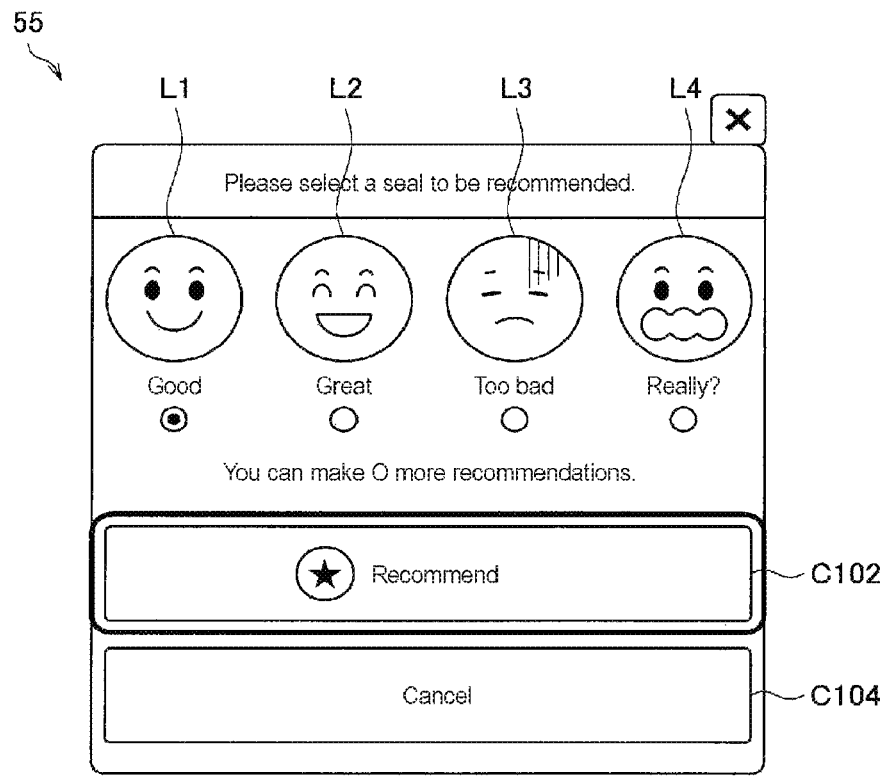
FIG. 5 is an explanatory view showing a specific example of an object selection window displayed on a user terminal.

FIG. 5 is an explanatory view showing a specific example of the object selection window 55 displayed on the user terminal U. The object selection window 55 includes a plurality of objects L1 to L4 representing respective impressions on the content, a decision button C102, and a cancel button C104. As shown in FIG. 5, the objects L1 to L4 represent different impressions on the content with the use of respective different words and symbols. In a case where any one of the objects L1 to L4 is selected and the decision button C102 is further selected by the user, the user terminal U transmits specification information containing object information on the object selected by the user to the content provision server 10. On the contrary, in a case where the cancel button C104 is selected by the user, the user terminal U does not transmit the specification information containing the object information on the object selected by the user to the content provision server 10, and the display control unit 302 causes the user terminal U to close the object selection window 55.

Note that the number and appearance of the objects L1 to L4 shown in FIG. 5 are merely examples, and the number of the objects may be other than four, and the objects may be other words, figures, or symbols, or combination thereof. Further, the appearance of the objects may be different depending on the specified time period, a category to which the content belongs, a provision source of the content, or the like. Further, the technical scope of the present disclosure is not limited to an example where the decision button C102 and the cancel button C104 include words "Recommend" and "Cancel", respectively, and the decision button C102 and the cancel button C104 may include other words, figures, or symbols, or combinations thereof.

Further, the display control unit 302 may display, on the user terminal U, a confirmation window for causing the user to confirm an object selected by the user. For example, in a case where the object L1 is selected and the decision button C102 is further selected by the user in the object selection window 55, the display control unit 302 displays a confirmation window 57 shown in FIG. 6 on the user terminal U. The confirmation window 57 includes the object L1 selected by the user and a confirmation button D102. In a case where the confirmation button D1 is selected by the user, the display control unit 302 causes the user terminal U to close the confirmation window 57.

Note that the technical scope of the present disclosure is not limited to an example where the confirmation button D102 includes a word "Close", and the confirmation button D102 may be another word, figure, or symbol, or a combination thereof.

Figure 6:
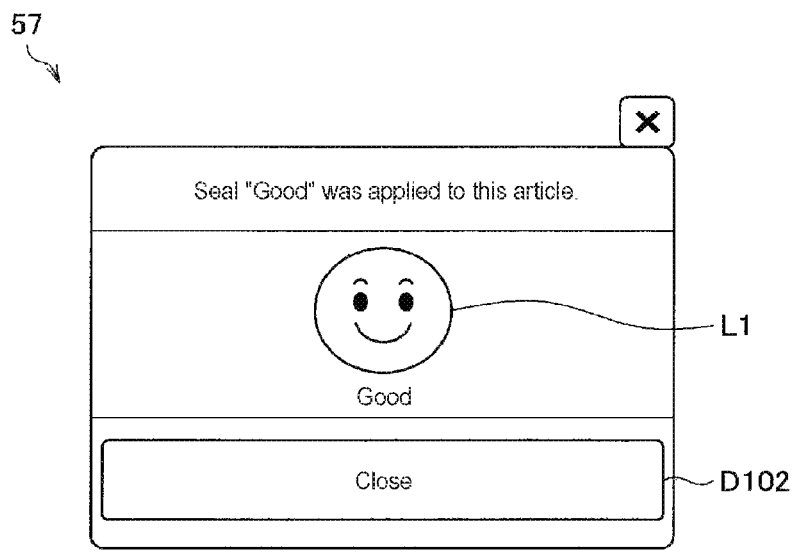
FIG. 6 is an explanatory view showing a specific example of a confirmation window displayed on a user terminal.
Figure 7:
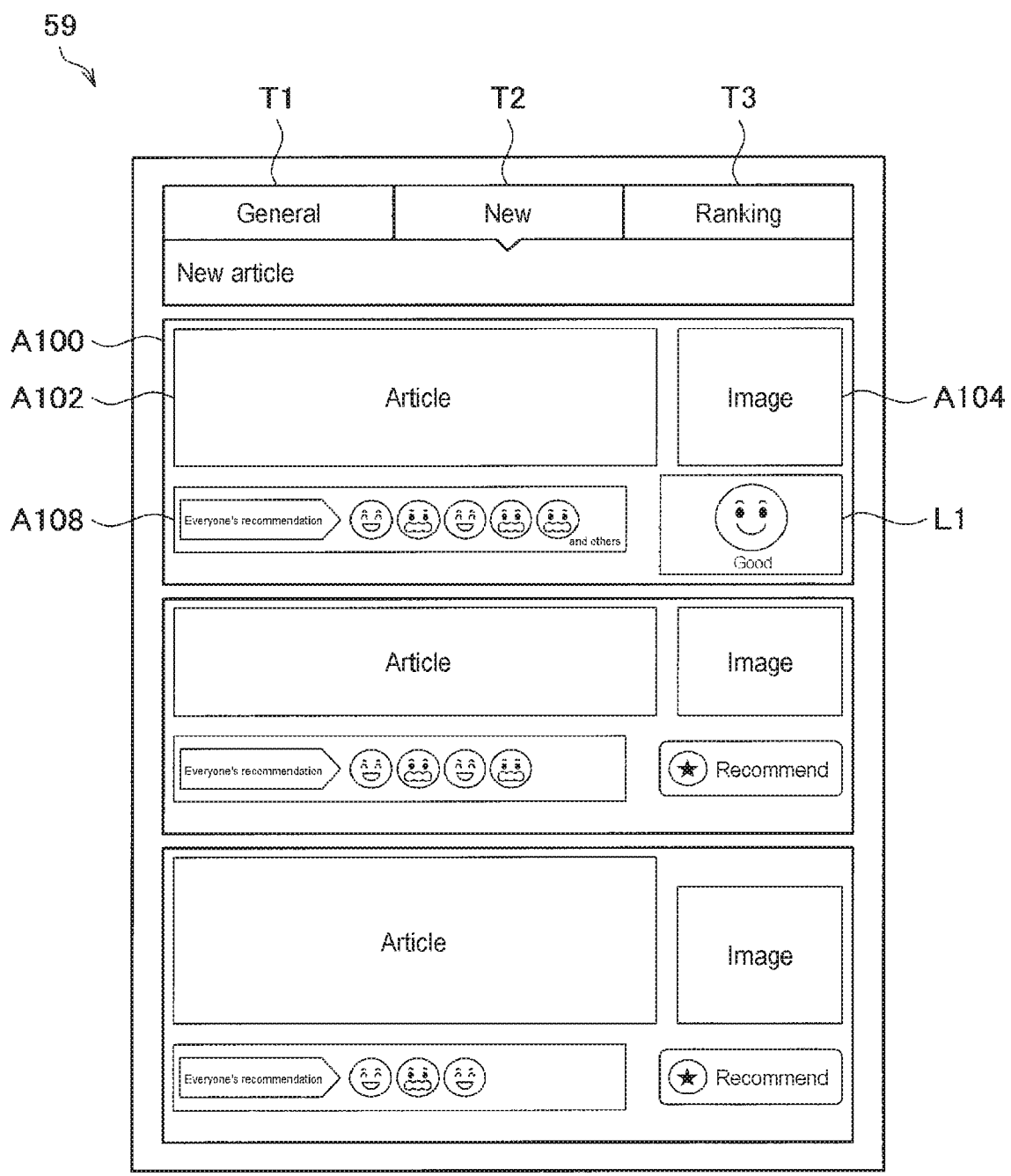
FIG. 7 is an explanatory view showing a specific example of a content list screen displayed on a user terminal.

In the case where specification of the content is performed by the user, the display control unit 302 may display specification information of the content by the user on the content list screen and the content detail screen that have been described with reference to FIG. 3 and FIG. 4. For example, after the confirmation window 57 shown in FIG. 6 is closed, the display control unit 302 may display a content list screen 59 shown in FIG. 7 on the user terminal U. In the content display area A100 shown in FIG. 7, the content specification button A106 is not displayed, and the object L1 selected by the user is displayed as the specification information.

(Calculation Unit)

The calculation unit 304 acquires a plurality of pieces of specification information acquired from the plurality of users from the storage unit 200 and calculates the number of times in which each piece of content is specified by the plurality of users on the basis of the plurality of pieces of the specification information acquired from the plurality of users. Then, the calculation unit 304 outputs the above calculated number of times to the content ranking generation unit 306.

The calculation unit 304 may calculate the number of times in which each piece of content is specified by the plurality of users every time when the specified time period passes. For example, in a case where the specified time period is one day, the calculation unit 304 may calculate the number of times in which each piece of content that was a specification target on the previous day is specified by the plurality of users every time when one day passes.

(Content Ranking Generation Unit)

The content ranking generation unit 306 generates a content ranking on the basis of the number of times in which each piece of content is specified by the plurality of users, the number of times being calculated by the calculation unit 304. For example, the content ranking generation unit 306 generates a content ranking in descending order of the number of times specified by the plurality of users. Then, the content ranking generation unit 306 stores the generated content ranking on the storage unit 200. Further, the content ranking generation unit 306 generates a content ranking every time when the specified time period passes and updates the content ranking stored on the storage unit 200.

The display control unit 302 displays a content ranking screen showing the content ranking stored on the storage unit 200 on the user terminal U in response to predetermined user input. For example, in a case where the ranking tab T3 is selected by the user on the content list screen 51 shown in FIG. 3, the display control unit 302 displays, on the user terminal U, a content ranking screen of pieces of content that were specification targets on the previous day. Note that a piece of content having a rank lower than a certain rank may not be displayed on the content ranking screen.

Figure 8:
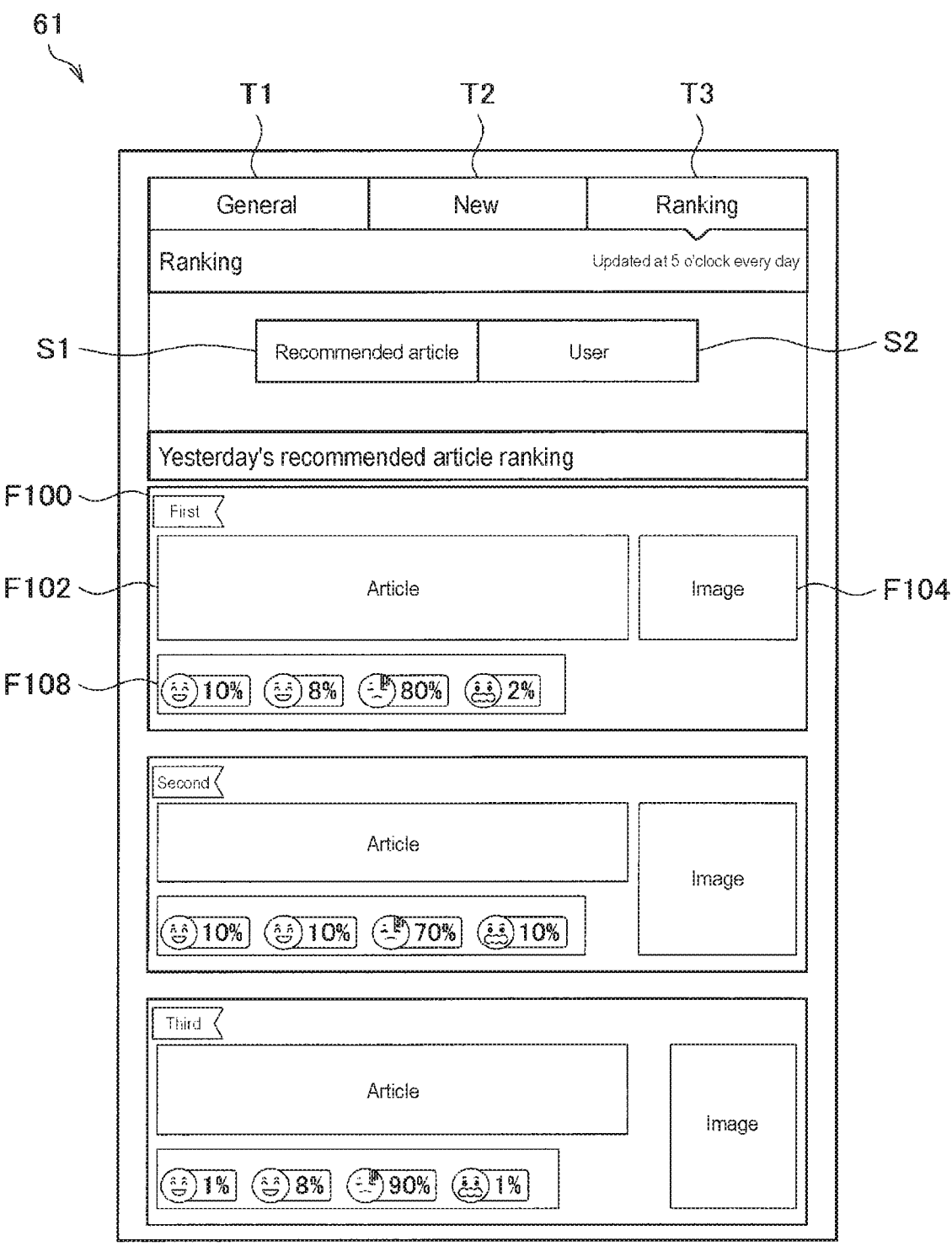
FIG. 8 is an explanatory view showing a specific example of a content ranking screen displayed on a user terminal.

FIG. 8 is an explanatory view showing a specific example of a content ranking screen 61 displayed on the user terminal U. In FIG. 8, a content display area F100 is shown as an example of an area showing a single piece of content among a plurality of pieces of content. For example, an article F102 and an image F104 of the content are displayed in the content display area F100. Furthermore, specification information F108 of the content by other users is displayed in the content display area F100. As shown in FIG. 8, the specification information F108 of the content by other users may be, for example, information on a ratio of the numbers of times in which objects representing respective impressions on the content are selected. Further, the objects representing the respective impressions on the content may be displayed in the content display area F100 as a part of the specification information F108 of the content by other users, and appearance of the displayed objects may be different depending on the specified time period, a category to which the content belongs, a provision source of the content, or the like.

Further, as shown in FIG. 8, the content ranking screen 61 may include a recommended article button S1 and a user button S2 for switching screens. The content ranking screen 61 shown in FIG. 8 is a screen displayed in a case where the recommended article button S1 is selected. Note that a user ranking screen displayed in a case where the user button S2 is selected will be described below.

Further, the display control unit 302 may display, on the user terminal U, a content detail screen showing detailed information of the content corresponding to the content display area F100 in response to predetermined user input such as a tap or a click to the article F102 of the content.

Note that, in a case where categories to which a plurality of pieces of content that were specification targets on the previous day belong are not the same, the content ranking generation unit 306 may generate a plurality of content rankings for the respective categories.

(Extraction Unit)

The extraction unit 308 extracts content on the basis of the content ranking generated by the content ranking generation unit 306. The extraction unit 308 extracts, for example, content having a rank equal to or more than a threshold set in advance from the content ranking.

Note that, in a case where a plurality of content rankings are generated for respective categories by the content ranking generation unit 306, the extraction unit 308 may extract content from each of the plurality of generated content rankings.

(Application Unit)

The application unit 310 controls application of a point to a plurality of users on the basis of the number of times in which each piece of content is specified by the plurality of users, the number of times being calculated by the calculation unit 304. For example, the application unit 310 applies a point to a user who specifies content extracted by the extraction unit 308. Further, the application unit 310 outputs information indicating the point applied to each user to the ranking unit 312.

Further, the application unit 310 may control application of a point on the basis of a plurality of pieces of object information acquired from the plurality of users. For example, the application unit 310 may apply a point to the users on the basis of a ratio of the numbers of times in which the respective objects are selected regarding the content extracted by the extraction unit 308. Specifically, the application unit 310 may control a point so that a higher point is applied to a user who selects an object having a large number of times selected by the plurality of users regarding the content extracted by the extraction unit 308.

Further, the application unit 310 may control application of a point on the basis of category information of each piece of content and the number of times in which each piece of content is specified by the plurality of users, the number of times being calculated by the calculation unit 304. For example, in a case where a plurality of content rankings are generated for respective categories and content is extracted from each of the plurality of content rankings, the application unit 310 may apply a point to a user who specifies the extracted content on the basis of a category to which the content belongs. Note that the application unit 310 may control application of a point on the basis of the specified time period or a distribution source of the content specified by the user.

Further, in a case where all pieces of content specified by a single user are included in the pieces of content extracted by the extraction unit 308, the application unit 310 may further apply a point to the single user.

Further, the application unit 310 may apply a point to a user who specifies content the earliest regarding each piece of content. For example, when the user specifies content that is not specified by other users by referring to specification information of content by other users displayed on the user terminal U, the user can obtain a point. With this, it is possible to reduce the user's resistance to specify content that is not specified by other users.

Further, the application unit 310 may control a point to be applied to a single user by specifying content in this specified time period depending on whether or not a point has been applied to the single user by specifying content in the previous specified time period. For example, in a case where a point has been applied to a single user by specifying content in the previous specified time period, the application unit 310 may increase a point to be applied to the single user by specifying content in this specified time period, as compared to a case where a point has not been applied to the single user by specifying content in the previous specified time period.

Note that a point to be applied to the user by the application unit 310 is merely an example of an incentive, and the technical scope of the present disclosure is not limited to such an example. For example, the application unit 310 may apply an electronic coupon, additional information related to content specified by the user, or the like to the user as the incentive.

(Ranking Unit)

The ranking unit 312 ranks the plurality of users on the basis of a point applied to each of the plurality of users by the application unit 310. Specifically, the ranking unit 312 ranks the plurality of users by generating a user ranking on the basis of information indicating a point input from the application unit 310 and applied to each user and updating the user ranking. First, the ranking unit 312 generates a user ranking when a first specified time period passes and stores the generated user ranking and the point applied to each user on the storage unit 200. Thereafter, the ranking unit 312 repeatedly update the user ranking and the point applied to each user stored on the storage unit 200 in a certain time period every time when the specified time period passes.

Figure 9:
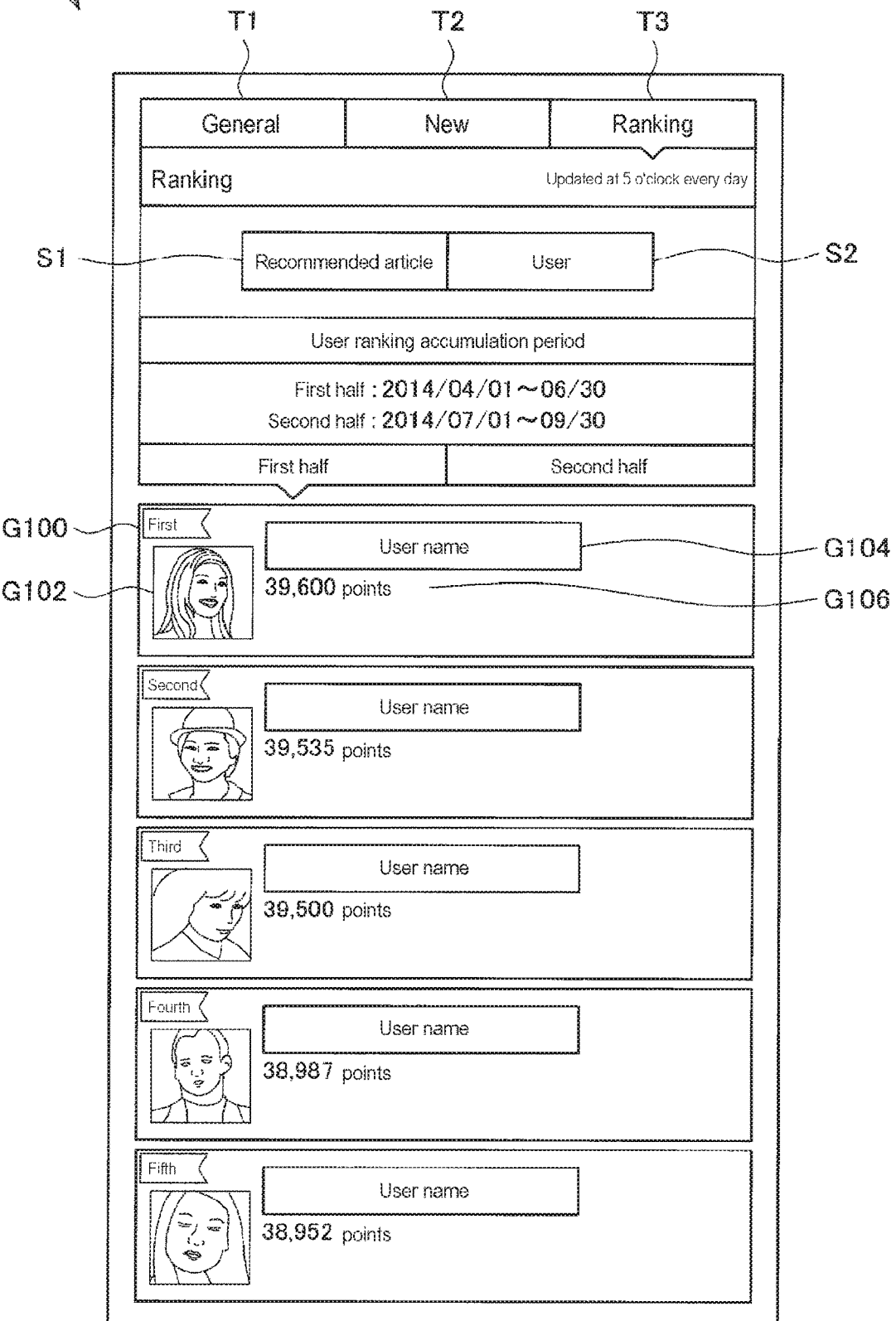
FIG. 9 is an explanatory view showing a specific example of a user ranking screen displayed on a user terminal.

The display control unit 302 displays a user ranking screen showing the user ranking stored on the storage unit 200 on the user terminal U in response to predetermined user input. For example, in a case where the user button S2 is selected by the user on the content ranking screen 61 shown in FIG. 8, the display control unit 302 displays a user ranking screen 63 shown in FIG. 9 on the user terminal U. In FIG. 9, a user display area G100 is shown as an example of an area showing a single user among the plurality of users. For example, an image G102, a name G104, and an accumulated point G106 of the user are displayed in the user display area G100. Further, a plurality of time periods in which the user ranking is repeatedly updated by the ranking unit 312 may exist. For example, different user rankings may be generated and be updated in a time period corresponding to a first half and a time period corresponding to a second half shown in FIG. 9.

Note that the application unit 310 may apply a privilege such as an electronic coupon to a higher rank person when the time period in which the user ranking is repeatedly updated by the ranking unit 312 is completed. Further, the ranking unit 312 may generate a user ranking for each category on the basis of a category to which content specified by each user who has obtained a point belongs, and, in that case, a privilege to be applied to a higher rank person by the application unit 310 may be different between the categories of the user rankings.

2-2. Operation

A flow of processing performed by the content provision server 10 according to the embodiment of the present disclosure will be described with reference to FIG. 10. Note that the specified time period is assumed to be one day in the following description of the flow of the processing performed by the content provision server 10.

Figure 10:
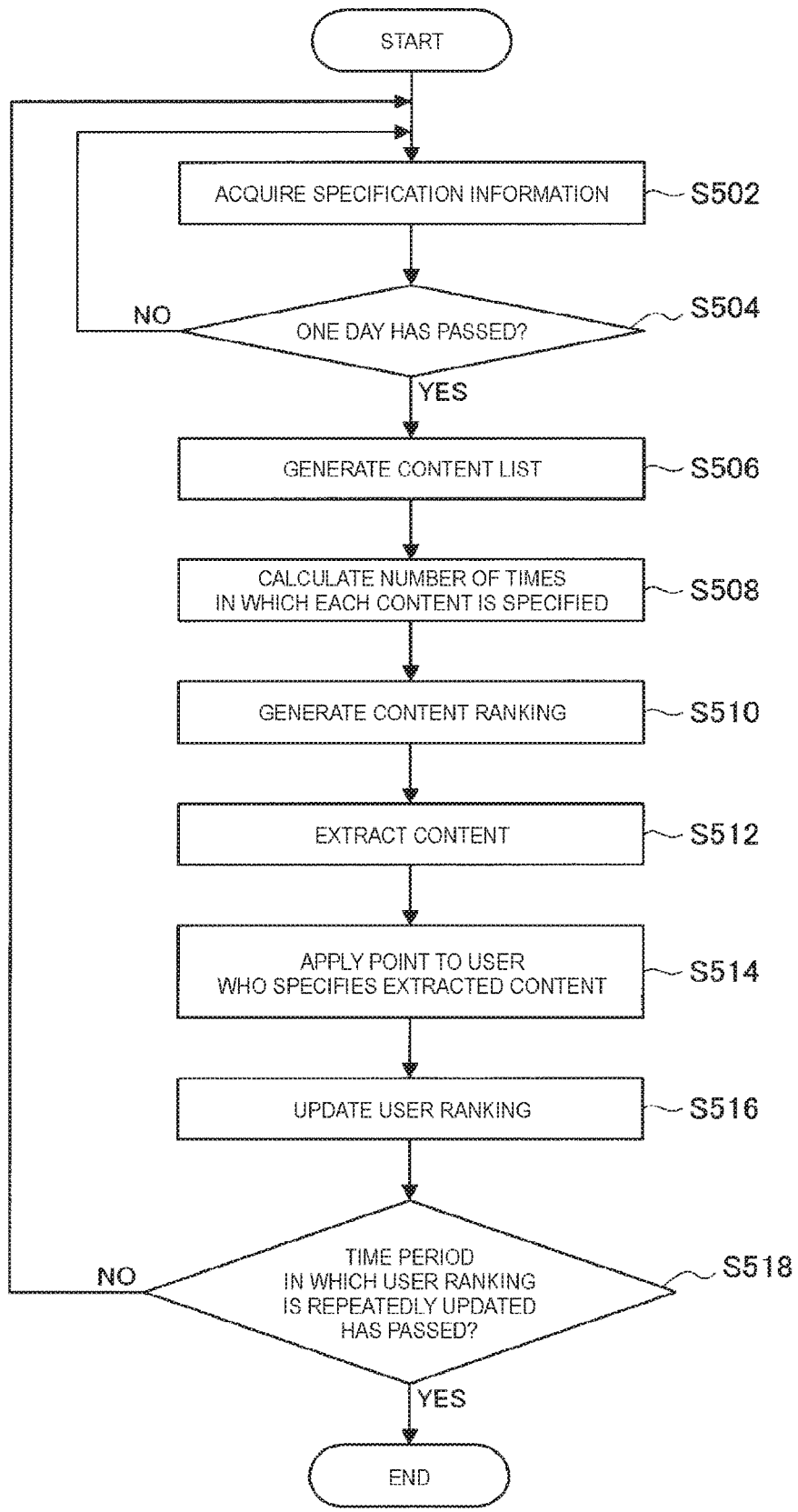
FIG. 10 is a flowchart showing a specific example of a flow of processing performed by a content provision server according to an embodiment of the present disclosure.

FIG. 10 is a flowchart showing a specific example of the flow of the processing performed by the content provision server 10 according to the embodiment of the present disclosure. As shown in FIG. 10, first, when the communication unit 100 acquires a plurality of pieces of specification information for specifying content from a plurality of users, respectively (Step S502), the communication unit 100 stores the plurality of acquired pieces of the specification information on the storage unit 200. In a case where one day has not passed yet (Step S504/NO), the processing returns to the processing in Step S502. On the contrary, in a case where one day has passed (Step S504/YES), the display control unit 302 generates a content list to be displayed on the user terminal U (Step S506) and stores the generated content list on the storage unit 200. Then, the calculation unit 304 calculates the number of times in which each piece of content is specified by the plurality of users on the basis of the plurality of pieces of the specification information acquired from the plurality of users (Step S508). Then, the content ranking generation unit 306 generates a content ranking on the basis of the number of times in which each piece of content is specified by the plurality of users (Step S510) and stores the generated content ranking on the storage unit 200. Then, the extraction unit 308 extracts content on the basis of the content ranking (Step S512). Then, the application unit 310 applies a point to a user who specifies the extracted content (Step S514). Then, the ranking unit 312 updates a user ranking stored on the storage unit 200 on the basis of the point applied to each of the plurality of users (Step S516). Then, in a case where the time period in which the user ranking is repeatedly updated has not passed yet (Step S518/NO), the processing returns to the processing in Step S502. On the contrary, in a case where the time period in which the user ranking is repeatedly updated has passed (Step S518/YES), the processing shown in FIG. 10 is completed.

2-3. Effects

According to the above embodiment, the calculation unit 304 calculates the number of times in which each piece of content is specified by a plurality of users on the basis of a plurality of pieces of specification information acquired from the plurality of users, and the application unit 310 controls application of an incentive to the plurality of users on the basis of the number of times in which each piece of the content is specified by the plurality of users, the number of times being calculated by the calculation unit 304. With this, it is possible to urge the plurality of users to recommend content.

Further, according to a certain embodiment, the ranking unit 312 ranks a plurality of users on the basis of a point applied to each of the plurality of users by the application unit 310. With this, it is possible to stimulate willingness of the users to achieve goals.

Further, according to a certain embodiment, the display control unit 302 restricts a time period in which a user can specify content to a predetermined time period. With this, it is possible to increase a frequency of update of content to be provided to the user. Therefore, it is possible to provide content in which the user is highly interested.

Further, according to a certain embodiment, the display control unit 302 determines the number of pieces of content that can be specified by each user within a predetermined time period. With this, it is possible to cause the user to specify suitable content as content to be recommended to another user.

Further, according to a certain embodiment, the display control unit 302 determines the number of pieces of content that can be specified by each user within the predetermined time period on the basis of a frequency of access to the content provision server 10 from each user. With this, it is possible to urge use of a content provision service.

Further, according to a certain embodiment, specification information acquired by the communication unit 100 contains object information on an object selected by a user from a plurality of objects representing respective impressions on content. With this, it is possible to smoothly notify the user of impressions on each piece of content by a plurality of users.

Further, according to a certain embodiment, the application unit 310 controls an incentive to be applied to a user on the basis of a plurality of pieces of object information acquired from a plurality of users. With this, it is possible to cause the user to select a suitable impression as an impression on content.

Further, according to a certain embodiment, application of an incentive to a plurality of users is controlled on the basis of category information of each piece of content and the number of times in which each piece of content is specified by the plurality of users, the number of times being calculated by the calculation unit 304. With this, it is possible to stimulate willingness of the plurality of users to achieve respective goals even in a case where categories in which the plurality of users are interested are different from each other.

2-4. Application Example

In the preceding section, an embodiment of the present disclosure capable of urging a plurality of users to recommend content has been described. In this section, an application example capable of smoothly sharing content between a user and another user will be further described.

In the application example, the display control unit 302 has a function of specifying content extracted by the extraction unit 308 and permitting sharing of the above content between a user to which a point is applied by the application unit 310 and another user in a network service other than a network service provided by the content provision server 10.

Specifically, the display control unit 302 realizes the above function by specifying content extracted by the extraction unit 308 and displaying a share button on the user terminal U used by the user to which the point is applied by the application unit 310. Herein, the share button displayed on the user terminal U is a button for sharing the above content with another user in a network service (for example, social network service) other than the network service provided by the content provision server 10. Hereinafter, an example of display of such a share button will be described.

Figure 11:
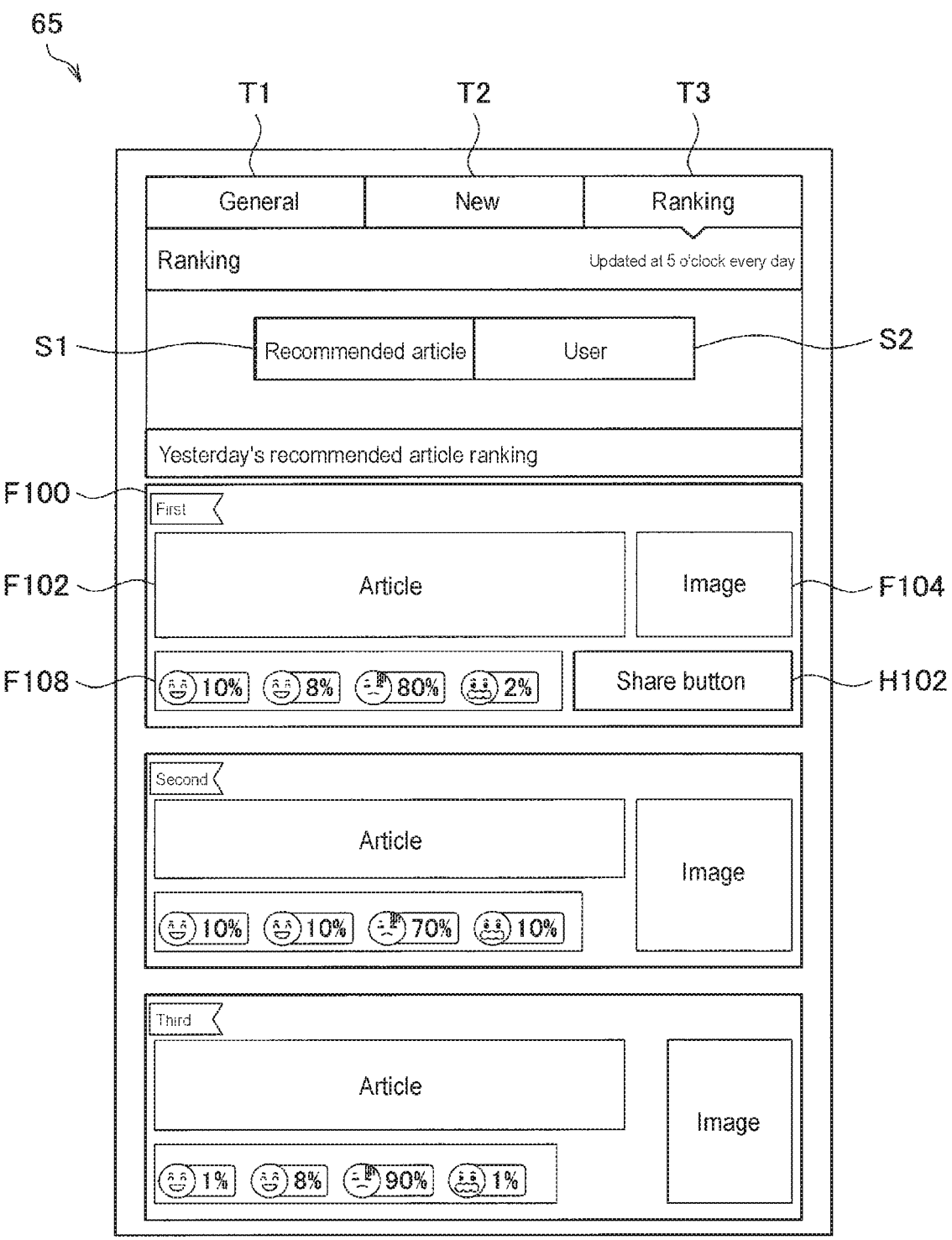
FIG. 11 is an explanatory view showing a specific example of a content ranking screen displayed on a user terminal.

FIG. 11 is an explanatory view showing a specific example of a content ranking screen 65 displayed on the user terminal U by the display control unit 302 in the application example. In FIG. 11, the content display area F100 is shown as an example of an area showing a single piece of content among a plurality of pieces of content. The content ranking screen 65 is a screen that can be displayed on the user terminal U in a case where content corresponding to the content display area F100 is extracted by the extraction unit 308 and the content is specified by the user. As shown in FIG. 11, a share button H102 of the content corresponding to the content display area F100 is displayed in the content display area F100.

Figure 12:
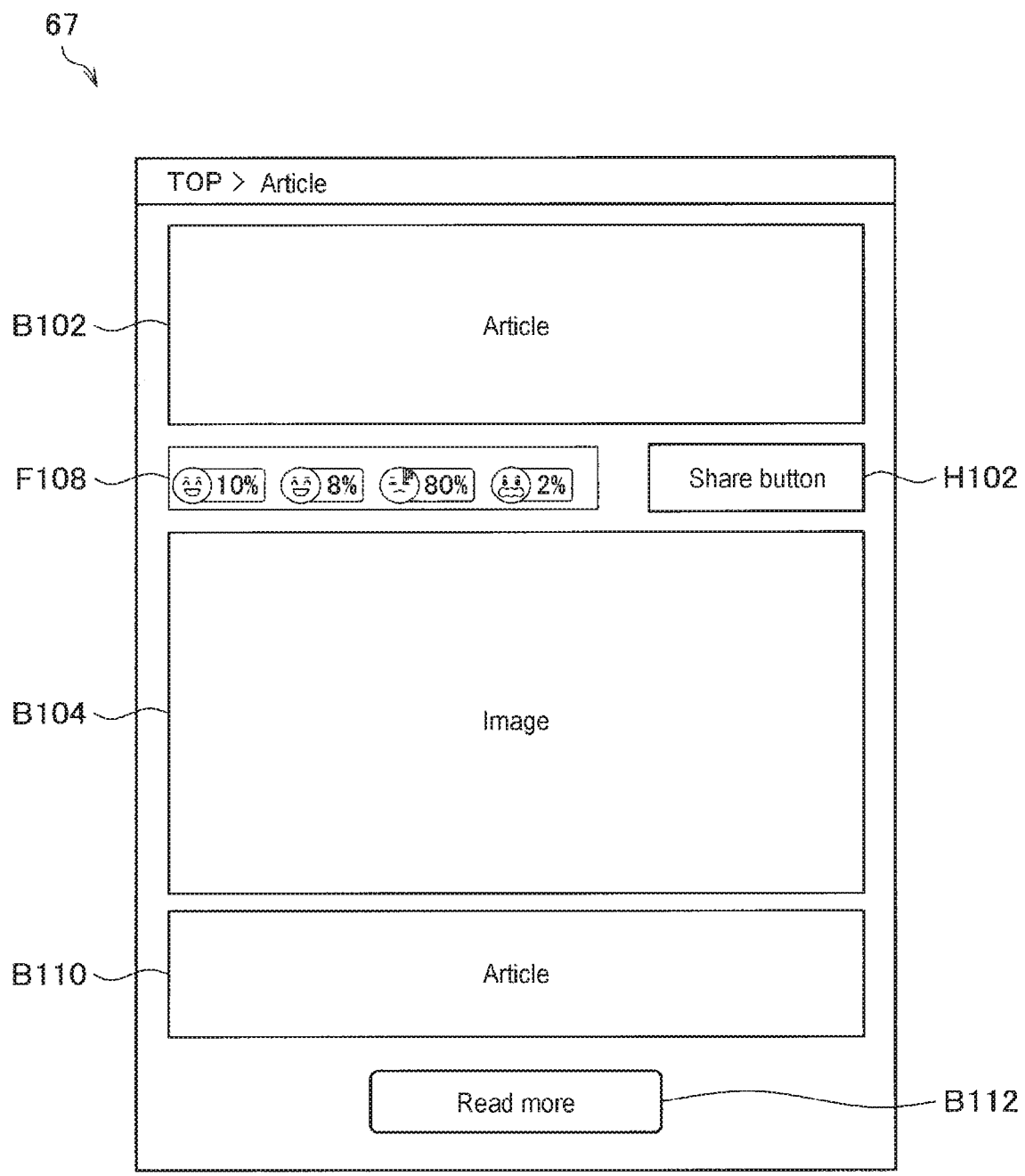
FIG. 12 is an explanatory view showing a specific example of a content detail screen displayed on a user terminal.

FIG. 12 is an explanatory view showing a specific example of a content detail screen 67 displayed on the user terminal U by the display control unit 302 in the application example. The content detail screen 67 shown in FIG. 12 is a screen displayed in response to predetermined user input such as a tap or a click to the article F102 of the content on the content ranking screen 65 shown in FIG. 11 and shows detailed information of the content corresponding to the content display area F100 shown in FIG. 11. The share button H102 is displayed on the content detail screen 67 shown in FIG. 12 as well as on the content ranking screen 65 shown in FIG. 11. Note that, at a time at which the content detail screen 67 is displayed, the content displayed by the content detail screen 67 is not content that is a specification target by the user. Thus, as shown in FIG. 12, information on a ratio of the numbers of times in which the objects representing the respective impressions on the content are selected may be displayed on the content detail screen 67 as the specification information F108 of the content by other users.

By selecting the share button H102 shown in FIG. 11 and FIG. 12, the user can share the content corresponding to the content display area F100 shown in FIG. 11 with another user in a network service other than the network service provided by the content provision server 10.

Further, in the application example, the application unit 310 further applies a point to the user who shares content with another user permitted by the display control unit 302. Further, the application unit 310 may control a point to be applied to a plurality of users in accordance with order in which the plurality of users share content with another user. For example, the application unit 310 may control a point so that a higher point is applied to a user who shares content with another user earlier.

According to the above application example, the display control unit 302 permits sharing of the above content between a user who specifies content extracted by the extraction unit 308 and another user in a network service other than the network service provided by the content provision server 10. With this, it is possible to smoothly share content between a user and another user.

Further, according to a certain application example, the application unit 310 further applies a point to a user who shares content with another user permitted by the display control unit 302. With this, the user's interest in presence/absence of permission to share content with another user is increased, and therefore it is possible to increase a frequency of use of a content provision service.

3. Hardware Configuration

Hereinabove, an embodiment of the present disclosure has been described. The processing of the content provision server 10 described above is realized by cooperation between software and hardware of the content provision server 10 described below.

Figure 13:
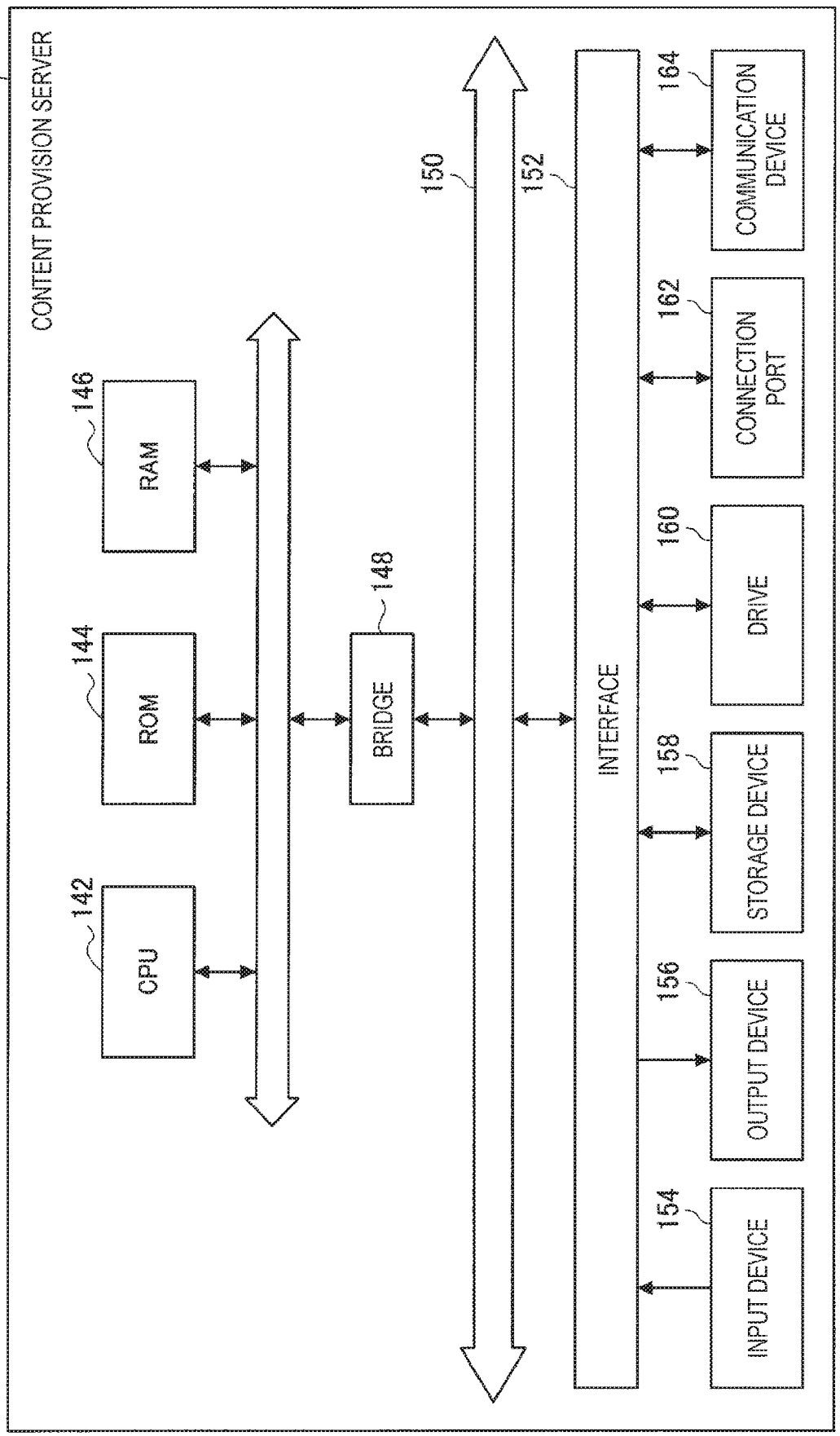
FIG. 13 is an explanatory view showing a specific example of a hardware configuration of a content provision server according to the present disclosure.

FIG. 13 is an explanatory view showing a hardware configuration of the content provision server 10 according to the present disclosure. As shown in FIG. 13, the content provision server 10 includes a central processing unit (CPU) 142, a read only memory (ROM) 144, a random access memory (RAM) 146, a bridge 148, a bus 150, an interface 152, an input device 154, an output device 156, a storage device 158, a drive 160, and a connection port 162, and a communication device 164.

The CPU 142 functions as an arithmetic processing unit and a control device and realizes operation of the control unit 300 in the content provision server 10 in cooperation with various types of programs. Further, the CPU 142 may be a microprocessor. The ROM 144 stores a program, an arithmetic parameter, or the like used by the CPU 142. The RAM 146 temporarily stores a program used in execution of the CPU 142, a parameter that is appropriately changed in execution, or the like. The CPU 142, the ROM 144, and the RAM 146 are connected to one another via an internal bus configured by a CPU bus or the like.

The input device 154 is, for example, input means for allowing a user to input information such as a mouse, a keyboard, a touchscreen, a button, a microphone, a switch, and a lever and is configured by, for example, an input control circuit for generating an input signal on the basis of input from a user and outputting the input signal to the CPU 142. By operating the input device 154, a user of the content provision server 10 can input various types of data to the content provision server 10 and instruct the content provision server 10 to perform processing operation.

The output device 156 performs output to a device such as a liquid crystal device (LCD) device, an organic light emitting diode (OLED) device, or a lamp. Furthermore, the output device 156 may perform audio output to a loudspeaker, headphones, and the like.

The storage device 158 is a device for storing data. The storage device 158 may include a storage medium, a recording device for recording data on the storage medium, a reading device for reading data from the storage medium, a deletion device for deleting data recorded on the storage medium, and the like. The storage device 158 stores a program executed by the CPU 142 and various types of data.

The drive 160 is a reader/writer for a storage medium and is included in or is externally attached to the content provision server 10. The drive 160 reads information recorded on a removable storage medium attached thereto such as a magnetic disk, an optical disc, a magneto-optical disk, or a semiconductor memory and outputs the information to the RAM 144. Further, the drive 160 can also write information to the removable storage medium.

The connection port 162 is, for example, a bus for connection to an information processing device or a peripheral device provided outside the content provision server 10. Further, the connection port 162 may be a universal serial bus (USB).

The communication device 164 is, for example, a communication interface configured by a communication device for connection to a network. Further, the communication device 164 may be an infrared communication compatible device, a wireless local area network (LAN) compatible communication device, a long term evolution (LTE) compatible communication device, or a wired communication device for performing wired communication.

4. Conclusion

As described above, according to an embodiment of the present disclosure, the number of times in which each piece of content is specified by a plurality of users is calculated on the basis of a plurality of pieces of specification information acquired from the plurality of users, and application of an incentive to the plurality of users is controlled on the basis of the calculated number of times in which each piece of content is specified by the plurality of users. With this, it is possible to urge the plurality of users to recommend content.

Further, according to a certain embodiment, a plurality of users are ranked on the basis of a point applied to each of the plurality of users. With this, it is possible to stimulate willingness of the plurality of users to achieve goals.

Further, according to a certain application example, there is permitted sharing of the above content between a user who specifies extracted content and another user in a network service other than a network service provided by the content provision server. With this, it is possible to smoothly share content between a user and another user.

Hereinabove, there has been described an example where a point to be applied to a user is controlled on the basis of specification information for specifying content by the user. However, the technical scope of the present disclosure is not limited to such an example. For example, a part of specification information for specifying content by the user may not influence control of a point to be applied to the user.

Specifically, the content provision server 10 displays not only the above content specification button but also another button on the content list screen. The user can specify content by selecting the another button. However, specification information, which is obtained in such a manner that the user selects the another button, does not influence control a point to be applied to the user. Thus, it is possible to cause the user to specify more suitable content as content to be recommended to another user.

Further, the specification information, which is obtained in such a manner that the user selects the another button, and specification information, which is obtained in such a manner that the user selects the content specification button, may be separately displayed on the user terminal U. Thus, it is possible to provide, to the user, specification information of more suitable content recommended by a plurality of users.

In addition, the series of control processes carried out by each apparatus described in the present specification may be realized by software, hardware, or a combination of software and hardware. Programs that compose such software may be stored in advance for example on a storage medium (non-transitory medium) provided inside or outside each of the apparatus. As one example, during execution by a computer, such programs are written into RAM (Random Access Memory) and executed by a processor such as a CPU.

Note that it is not necessary for the processing described in this specification with reference to the flowchart to be executed in the order shown in the flowchart. Some processing steps may be performed in parallel. Further, some of additional steps can be adopted, or some processing steps can be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an acquisition unit configured to acquire a plurality of pieces of specification information for specifying content from a plurality of users, respectively; and a control unit configured to calculate the number of times in which each piece of the content is specified by the plurality of users on the basis of the plurality of pieces of the specification information acquired from the plurality of users and control application of an incentive to the plurality of users on the basis of the calculated number of times.

(2)

The information processing device according to (1), in which the incentive includes a point to be applied to a user, and the control unit ranks the plurality of users on the basis of the point applied to each of the plurality of users.

(3)

The information processing device according to (1) or (2), the control unit restricts a time period in which a user can specify content to a predetermined time period.

(4)

The information processing device according to (3), in which the control unit determines the number of pieces of content that can be specified by each user within the predetermined time period.

(5)

The information processing device according to (4), in which the control unit determines the number of pieces of content that can be specified by the each user within the predetermined time period on the basis of a frequency of access to the information processing device from the each user.

(6)

The information processing device according to any one of (1) to (5), in which the control unit extracts content on the basis of the calculated number of times and applies an incentive to a user who specifies the extracted content.

(7)

The information processing device according to (6), in which the control unit permits sharing of the extracted content between the user who specifies the extracted content and another user in a network service other than a network service provided by the information processing device.

(8)

The information processing device according to (7), in which the control unit further applies the incentive to the user who performs sharing with the another user.

(9)

The information processing device according to any one of (1) to (8), in which the specification information contains object information on an object selected by a user from a plurality of objects representing respective impressions on the content.

(10)

The information processing device according to (9), in which the control unit controls an incentive to be applied to a user on the basis of a plurality of pieces of the object information acquired from the plurality of users.

(11)

The information processing device according to any one of (1) to (10), in which the acquisition unit acquires category information of each piece of content, and the control unit controls application of an incentive to the plurality of users on the basis of the category information and the calculated number of times.

(12)

An information processing method, including:

acquiring a plurality of pieces of specification information for specifying content from a plurality of users, respectively, by using an information processing device;

calculating the number of times in which each piece of the content is specified by the plurality of users on the basis of the plurality of pieces of the specification information acquired from the plurality of users; and controlling application of an incentive to the plurality of users on the basis of the calculated number of times.

(13)

A program for causing a computer configured to control an information processing device to function as an acquisition unit configured to acquire a plurality of pieces of specification information for specifying content from a plurality of users, respectively, and a control unit configured to calculate the number of times in which each piece of the content is specified by the plurality of users on the basis of the plurality of pieces of the specification information acquired from the plurality of users and control application of an incentive to the plurality of users on the basis of the calculated number of times.

REFERENCE SIGNS LIST 1 information network
10 content provision server
V1, V2, V3 content provision source server
U1, U2, U3 user terminal
100 communication unit
142 central processing unit (CPU)
144 read only memory (ROM)
146 random access memory (RAM)
148 bridge
150 bus
152 interface
154 input device
156 output device
158 storage device
160 drive
162 connection port
164 communication device
200 storage unit
300 control unit
302 display control unit
304 calculation unit
306 content ranking generation unit
308 extraction unit
310 application unit
312 ranking unit

The invention claimed is:

1. An information processing server device, comprising:
a memory; and
processing circuitry configured to
restrict a time period in which each user of a plurality of users can specify content to a predetermined time period;
store, in the memory, a frequency of access to the information processing server device from the each user of the plurality of users;
determine a number of pieces of content that can be specified by the each user within the predetermined time period based on the stored frequency of access to the information processing server device from the each user;
acquire a plurality of pieces of specification information for specifying content from the plurality of users, respectively, the plurality of pieces of specification information being acquired during the predetermined time period with a limitation of the determined number of pieces of content that can be specified by the each user;
store, in the memory, the acquired plurality of pieces of specification information for the each user;
calculate a number of times in which each piece of the content is specified by the each user of the plurality of users based on the stored plurality of pieces of the specification information acquired from the each user of the plurality of users;
control application of an incentive to the each user of the plurality of users based on the calculated number of times; and
control display of the incentive on a user terminal based on the applied incentive.

2. The information processing server device according to claim 1,
wherein the incentive includes a point to be applied to a user, and
the processing circuitry ranks the plurality of users on the basis of the point applied to each of the plurality of users.

3. The information processing server device according to claim 1,
wherein the processing circuitry extracts content on the basis of the calculated number of times and applies an incentive to a user who specifies the extracted content.

4. The information processing server device according to claim 3,
wherein the processing circuitry permits sharing of the extracted content between the user who specifies the extracted content and another user in a network service other than a network service provided by the information processing server device.

5. The information processing server device according to claim 4, wherein the processing circuitry further applies the incentive to the user who performs sharing with the another user.

6. The information processing server device according to claim 1,
wherein the specification information contains object information on an object selected by a user from a plurality of objects representing respective impressions on the content.

7. The information processing server device according to claim 6,
wherein the processing circuitry controls the incentive to be applied to the user on the basis of a plurality of pieces of the object information acquired from the plurality of users.

8. The information processing server device according to claim 1,
wherein the processing circuitry acquires category information of each piece of content, and
the processing circuitry controls application of the incentive to the plurality of users on the basis of the category information and the calculated number of times.

9. An information processing method, comprising:
restricting a time period in which each user of a plurality of users can specify content to a predetermined time period;
storing, in a memory, a frequency of access to an information processing server device from the each user of the plurality of users;
determining, using processing circuitry of the information processing server device, a number of pieces of content that can be specified by the each user within the predetermined time period based on the stored frequency of access to the information processing server device from the each user;
acquiring a plurality of pieces of specification information for specifying content from the plurality of users, respectively, the plurality of pieces of specification information being acquired during the predetermined time period with a limitation of the determined number of pieces of content that can be specified by the each user;
storing, in the memory, the acquired plurality of pieces of specification information for the each user;
calculating, using the processing circuitry, a number of times in which each piece of the content is specified by the each user of the plurality of users based on the stored plurality of pieces of the specification information acquired from the each user of the plurality of users;
controlling, using the processing circuitry, application of an incentive to the each user of the plurality of users based on the calculated number of times; and
controlling display of the incentive on a user terminal based on the applied incentive.

10. A non-transitory computer readable medium including executable instructions, which when executed by processing circuitry of an information processing server device cause the processing circuitry to execute an information processing method, the method comprising:
restricting a time period in which each user of a plurality of users can specify content to a predetermined time period;
storing, in a memory, a frequency of access to an information processing server device from the each user of the plurality of users;
determining, using the processing circuitry, a number of pieces of content that can be specified by the each user within the predetermined time period based on the stored frequency of access to the information processing server device from the each user;
acquiring a plurality of pieces of specification information for specifying content from the plurality of users, respectively, the plurality of pieces of specification information being acquired during the predetermined time period with a limitation of the determined number of pieces of content that can be specified by the each user;
storing, in the memory, the acquired plurality of pieces of specification information for the each user;
calculating, using the processing circuitry, a number of times in which each piece of the content is specified by the each user of the plurality of users based on the stored plurality of pieces of the specification information acquired from the each user of the plurality of users;
controlling, using the processing circuitry, application of an incentive to the each user of the plurality of users based on the calculated number of times; and
controlling display of the incentive on a user terminal based on the applied incentive.

* * * * *